United States Patent
Wardle

(10) Patent No.: US 9,744,476 B2
(45) Date of Patent: Aug. 29, 2017

(54) 3D PRINTED MODULAR CENTRIFUGAL CONTACTORS AND METHOD FOR SEPARATING MOIETIES USING 3D PRINTED OPTIMIZED SURFACES

(71) Applicant: Kent E. Wardle, Brookfield, IL (US)

(72) Inventor: Kent E. Wardle, Brookfield, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 15/066,393

(22) Filed: Mar. 10, 2016

(65) Prior Publication Data

US 2016/0184735 A1 Jun. 30, 2016

Related U.S. Application Data

(63) Continuation-in-part of application No. 14/501,898, filed on Sep. 30, 2014, now Pat. No. 9,669,329.

(51) Int. Cl.
| | | |
|---|---|---|
| *B01D 11/00* | (2006.01) | |
| *B01D 11/04* | (2006.01) | |
| *B01D 15/18* | (2006.01) | |
| *B01J 14/00* | (2006.01) | |
| *B01J 19/18* | (2006.01) | |
| *B33Y 80/00* | (2015.01) | |

(52) U.S. Cl.
CPC ........ *B01D 11/048* (2013.01); *B01D 15/1807* (2013.01); *B01J 14/005* (2013.01); *B01J 19/18* (2013.01); *B01J 19/185* (2013.01); *B01D 15/1892* (2013.01); *B01D 2011/002* (2013.01); *B01J 2219/00024* (2013.01); *B01J 2219/00094* (2013.01); *B33Y 80/00* (2014.12)

(58) Field of Classification Search
CPC .............. B01D 11/048; B01D 15/1807; B01D 2011/002; B01J 14/005; B01J 19/18; B01J 2219/185; B01J 2219/00094; B33Y 80/00
See application file for complete search history.

(56) References Cited

U.S. PATENT DOCUMENTS

| | | | | |
|---|---|---|---|---|
| 5,582,724 A | * | 12/1996 | Rogers ............... | B01D 17/0217 210/221.2 |
| 5,591,340 A | * | 1/1997 | Meikrantz .......... | B01D 17/0217 210/360.1 |
| 9,669,329 B2 | * | 6/2017 | Wardle ................ | B01D 11/048 |

* cited by examiner

*Primary Examiner* — David A Reifsnyder
(74) *Attorney, Agent, or Firm* — Cherskov Flaynik & Gurda, LLC

(57) ABSTRACT

The present invention provides an annular centrifugal contactor, having a housing to receive a plurality of liquids; a rotor inside the housing; an annular mixing zone, with a plurality of fluid retention reservoirs; and an adjustable stem that can be raised to restrict the flow of a liquid into the rotor or lowered to increase the flow of liquid into the rotor. The invention also provides a method for transferring moieties from a first liquid to a second liquid, the method having the steps of combining the fluids in a housing whose interior has helically shaped first channels; subjecting the fluids to a spinning rotor to produce a mixture, whereby the channels simultaneously conduct the mixture downwardly and upwardly; and passing the mixture through the rotor to contact second channels, whereby the channels pump the second liquid through a first aperture while the first fluid exits a second aperture.

9 Claims, 12 Drawing Sheets

3D PRINTED MODULAR CENTRIFUGAL CONTACTORS AND METHOD FOR SEPARATING MOIETIES USING 3D PRINTED OPTIMIZED SURFACES

PRIORITY

This utility patent application is a Continuation In Part of U.S. patent application Ser. No. 14/501,898, filed on Sep. 30, 2014 now issued as U.S. Pat. No. 9,669,329.

CONTRACTUAL ORIGINS OF THE INVENTION

The U.S. Government has rights in this invention pursuant to Contract No. DE-AC02-06H11357 between the U.S. Department of Energy and UChicago Argonne, LLC, representing Argonne National Laboratory.

BACKGROUND OF THE INVENTION

1. Field of the Invention

This invention relates to centrifugal contactors, and more specifically, this invention relates to more efficient topographies of miniaturized centrifugal contactors realized with 3D printing.

2. Background of the Invention

Separation of liquids can be done in a variety of ways. If the liquids are immiscible and one liquid is denser than the other, centrifugal separation is a relatively quick and simple way to mix and separate the liquids. For example, water and oil are immiscible, and water is more dense than oil. Thus, after mixing, the water and oil can be separated using a device, such as an annular centrifugal contactor.

Annular centrifugal contactors spin liquids within its rotor at a high rate to impart centrifugal forces on the liquids. Centrifugal force is inertial in nature such that for different density objects rotating in the same reference frame and at the same rate, denser objects will experience greater outward force. For example, when separating an oil-water mixture, the water will experience a greater outward force, and a separation gradient will develop between the water and oil. Using this separation gradient, the water and oil can be selectively removed from the contactor. Such technology is used to recover crude oil from sea water after oil spills.

Another application for annular centrifugal contactors and immiscible liquids is solvent extraction (a type of liquid-liquid extraction). Solvent extraction processes isolate a desired compound or compounds from a feed solution (the solution comprising the desired compound dissolved in a solvent) by mixing the solution with a second immiscible liquid and then separating the two liquids. The second liquid is chosen for the desired compound's stronger affinity for that liquid over the original solvent. Depending on the polarity of the original feed solvent, the second liquid is either a polar (e.g., aqueous) liquid, such as an acid, or a nonpolar (i.e. nonaqueous or organic) liquid. Therefore, mixing the two liquids will allow the desired compound to transfer across the phase interface into the other liquid, while undesired compounds remain in the original liquid. Upon separation, the desired compound will be isolated in one of the immiscible liquids.

Separations chemistry has always played a crucial role in the preparation of reactor fuels for both nuclear energy and nuclear weapons production. It provides a means for cleaning up decommissioned nuclear facilities and disposing of high-level radioactive wastes. One strategy for reducing the volume of radioactive wastes requiring burial in geological repository is to transmute (or fission) the actinides into shorter-lived nuclides in a nuclear reactor or by bombardment with accelerator-produced neutrons. Typical fission yields for the actinides include significant amounts of the lanthanides. Some of the lanthanides have high neutron absorption cross sections, which interfere with neutron absorption and reduce the efficiency of the transmutation process. Efficient separation of the lanthanides from actinides is therefore critical to assure as low volume of waste is generated for ultimate disposal.

Separation of lanthanides from light actinides (thorium, uranium, plutonium and neptunium) are achieved by exploiting the greater extractability of the higher oxidation state of the light 5f elements (La, Ce, Pr, Nd, b Pm, Sm, Eu and Gd). However, the transplutonium actinides do not have stable higher oxidation states such that separation of lanthanide fission products from transplutonium actinides must depend on the small differences in their solution chemistry in the trivalent oxidation state. These small differences are rarely exploited when large volumes of waste are being processed using standard separators.

Among the most difficult of separations of metal ions are the intra- and inter-group separations of lanthanides and trivalent actinides. Yet, environmental concerns related to radioactivity and new high-tech developments which have increased the demand for pure lanthanides have combined to foster a greater need for effective procedure to attain these separations. Separation methods developed over the past 50-60 years are still in use.

Solvent extraction facilitates separation of lanthanides and actinides and also recovery of uranium and transuranics from nuclear waste. Some solvent extraction processes are done in a centrifugal contactor. Such a contactor comprises a rotor enclosed in a housing. Rotors require precision machining for proper balancing and tight tolerances of weir diameters. Certain housing components can be cast. (Machining requires multiple subparts, welding/brazing and additional machining.)

Centrifugal contactors must often be over-designed, incorporating excessive safety factors to handle used nuclear fuel, and also to accommodate uncertain liquid separation protocols. As such, these extremely expensive systems cannot be optimized for any particular separation.

State of the art annular centrifugal contactors are only able to extract elements that have fast kinetics, i.e., elements that will quickly transfer between the aqueous and non-aqueous (organic) phase. Fast kinetics is required because state of the art annular centrifugal contactors can only mix and hold the liquids for short residence times, typically in the range of three to five seconds for high-throughput contactors at nominal operating conditions. For most applications, the short residence time is seen as a benefit because longer residence times can cause solution degradation. For example, when reprocessing radioactive waste, solution degradation can result from irradiation of the solution. Additionally, strong acids are often used in solvent extractions, and acids can degrade the organic phase.

Notwithstanding the foregoing, short residence times are unsuitable for kinetically challenged separations that may require up to thirty seconds or more of residence time for the desired compounds to transfer between liquid phases. For example, kinetic limitations require approximately 30 seconds mixing residence time for efficient stripping (back extraction) of actinides.

Thus, a need exits in the art for an optimized system and method for centrifugal mixing having increased residence times (e.g., up to 60 seconds) such that solvent extraction processes can be performed in extraction systems targeting solutes with slow liquid-liquid interfacial transfer kinetics. The system and method should decrease droplet size while not exceeding the separative capacity of rotors. The system and method should provide steady feed flows inasmuch as low flows can degrade hold-up and mixing quality, therefor impacting consistency of inter-stage flows when multi-stage systems and methods are employed.

SUMMARY OF THE INVENTION

An object of the present invention is to overcome the challenges facing currently available annular centrifugal contactors.

Another object of the present invention is to provide an annular centrifugal contactor with a mixing zone that can increase fluid residence times inside the contactor. A feature of the present invention is that the mixing zone contains multiple helical tubes that recirculate fluid from the bottom of the mixing zone to the top of the mixing zone. An advantage of the present invention is that residence time in the mixing zone can be at least doubled. A further advantage of the present invention is that it can be used for kinetically challenged extractions, such as actinide-lanthanide separations, while also still being suitable for reactions with faster kinetics A further object of the present invention is to provide an annular centrifugal contactor in which the fluid throughput into the rotor can be restricted such that the mixing zone volume can be adjusted and maintain adequate holdup even at very low total throughput. A feature of the present invention is that the valve stem in the vane plate can be adjusted downwardly to increase or upwardly to decrease the effective entrance flow area of the rotor inlet and thus control the amount of fluid entering the rotor at a given time. Another feature of the present invention is that adjustment of the vane plate stem can be done manually or through the use of a mechanized assembly during operation. An advantage of the present invention is that mixing zone holdup can be maintained at low inlet feed rates allowing for a broader range of operation, including very long mixing zone residence times, as needed by controlling the amount of fluid entering the contactor. Liquid residence times of up to 60 seconds are possible, with residence times of between 2 seconds and 30 seconds more typical.

Still another object of the present invention is to provide a combination contactor housing with reservoirs to retain mixed fluids longer in the contactors. Another object is to provide a means for retrofitting existing contactors with mixed fluid reservoirs to increase fluid residence times within the contactors. A feature of the present invention is that the mixing zone can be modified to include heat transfer tubes that run countercurrent to the reservoirs (e.g., such reservoirs configured as helical tubes), baffles within the reservoirs (e.g., helical tubes) to increase the surface area for mixing, and catalyst, adsorbent, or reactant materials impregnated within the mixing zone, reservoirs, or both the mixing zone and reservoirs. An advantage of the present invention is that the mixing zone (i.e. contactor housing) can be printed using a 3D printer such that all of the aforementioned features can easily be incorporated in the mixing zone, and the fabricated part is also low cost such that it can potentially even be considered disposable.

Yet another object of the present invention is to provide a versatile vane plate stem that can serve a variety of functions in a centrifugal contactor. A feature of the present invention is that the vane plate stem can move vertically within the vane plate, and the stem can optionally be hollow. An advantage of the present invention is that the adjustable nature of the stem allows it to act as a needle valve, limiting flow into the rotor aperture, while simultaneously providing a drain means for evacuation of spent liquor from the confines of the contactor. (For example, the stem could serve as a drain tube.)

An additional object of the present invention is to utilize the residual separative capacity of the rotor when operating at relatively low total throughput and extended residence time by enhancing the mixing intensity of the annular mixing zone. A feature of the present invention is that the surface topography of the rotor is modified with features designed to increase liquid shear and turbulence in the annular mixing zone, which leads to decreased mean liquid droplet size (thus increasing the overall liquid-liquid interfacial area for solute transfer and improving extraction efficiency). An advantage of the present invention is that the nominal size of the rotor remains the same, and the modified rotor can, therefore, be retrofitted to existing contactor designs.

Still another object of the present invention is providing a compact centrifugal mixer with optimized surfaces. A feature of the invention is the use of 3D printing to form, etch, and otherwise position topographical details onto internal surfaces of the mixer. An advantage of the invention is that the formed details optimize flow and separations occurring in volumes and parts neither heretofore possible nor observed.

Still another object of the present invention is to provide rotors for compact centrifugal mixers wherein the rotors have unique topographies. A feature of the topographies is a plurality of grooves, which may be angled away from the direction of flow of fluid, in existing heavy phase flow channels. An advantage of the invention is that these grooves facilitate transport of the heavy phase out of its respective weir. Another advantage is that the grooves counteract resistance the fluid experiences at extremely small fluid volumes, the observance of which was made possible with 3D fabrication of the mixers.

Yet another object of the present invention is to provide a compact centrifugal mixer which can be reversibly assembled, disassembled and reconfigured. A feature of the invention is that the mixer contains no welds. An advantage of the invention is that its construction allows for piece meal transit into glove boxes or other constrained, controlled atmospheres for subsequent assembly, usage, disassembly, reconditioning, and ultimately disposal. Weldless feature allows for reconfiguring mixers for different phases.

Briefly, the present invention provides an annular centrifugal contactor having a housing adapted to receive a plurality of flowing liquids; a rotor on the interior of the housing; an annular mixing zone, wherein the annular mixing zone has a plurality of fluid retention reservoirs with ingress apertures near the bottom of the annular mixing zone and egress apertures located above the ingress apertures of the annular mixing zone; and an adjustable vane plate stem, wherein the stem can be raised to restrict the flow of a liquid into the rotor or lowered to increase the flow of the liquid into the rotor.

The present invention also provides an annular mixing zone for an annular centrifugal contactor, wherein the annular mixing zone has a plurality of helical mixing tubes with inlets near the bottom of the annular mixing zone and outlets located within the annular mixing zone at a vertical position above the tube inlets.

Additionally, the present invention provides a method for performing a liquid-liquid extraction, the method comprising the steps of selecting a first liquid containing a desired constituent; selecting a second liquid having a different density than the first liquid, wherein the desired constituent has a greater affinity for the second liquid than the first liquid; providing a centrifugal contactor with an annular mixing zone, wherein the annular mixing zone has a plurality of helical mixing tubes with ingress apertures near the bottom of the annular mixing zone and egress apertures located above the inlets of the annular mixing zone; flowing the first and second liquid into the annular mixing zone, including into the helical mixing tubes; mixing the first and second liquid in the annular mixing zone using a rotor; directing the first and second liquid into the interior of the rotor using a vane plate; separating the first and second liquid based on their relative densities using centrifugal force on the inside of the rotor; and extracting the first liquid as a first stream and the second liquid as a second stream, wherein the second stream contains at least some of the desired constituent.

The invention also provides a method for transferring moieties from a first liquid to a second liquid, the method comprising combining the first fluid and the second fluid in a housing, wherein regions of longitudinally extending interior surfaces of the housing comprise helically shaped first channels; subjecting the first fluid and second fluid to a spinning hollow rotor to produce a mixture, whereby the channels simultaneously conduct the mixture downwardly and upwardly; and passing the mixture through a first end of the rotor to contact medially facing surfaces of the rotor defining second channels, whereby the channels pump the second liquid through a first aperture located at a second end of the rotor while the first fluid exits a second aperture located at the second end of the rotor.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

Figure 1:
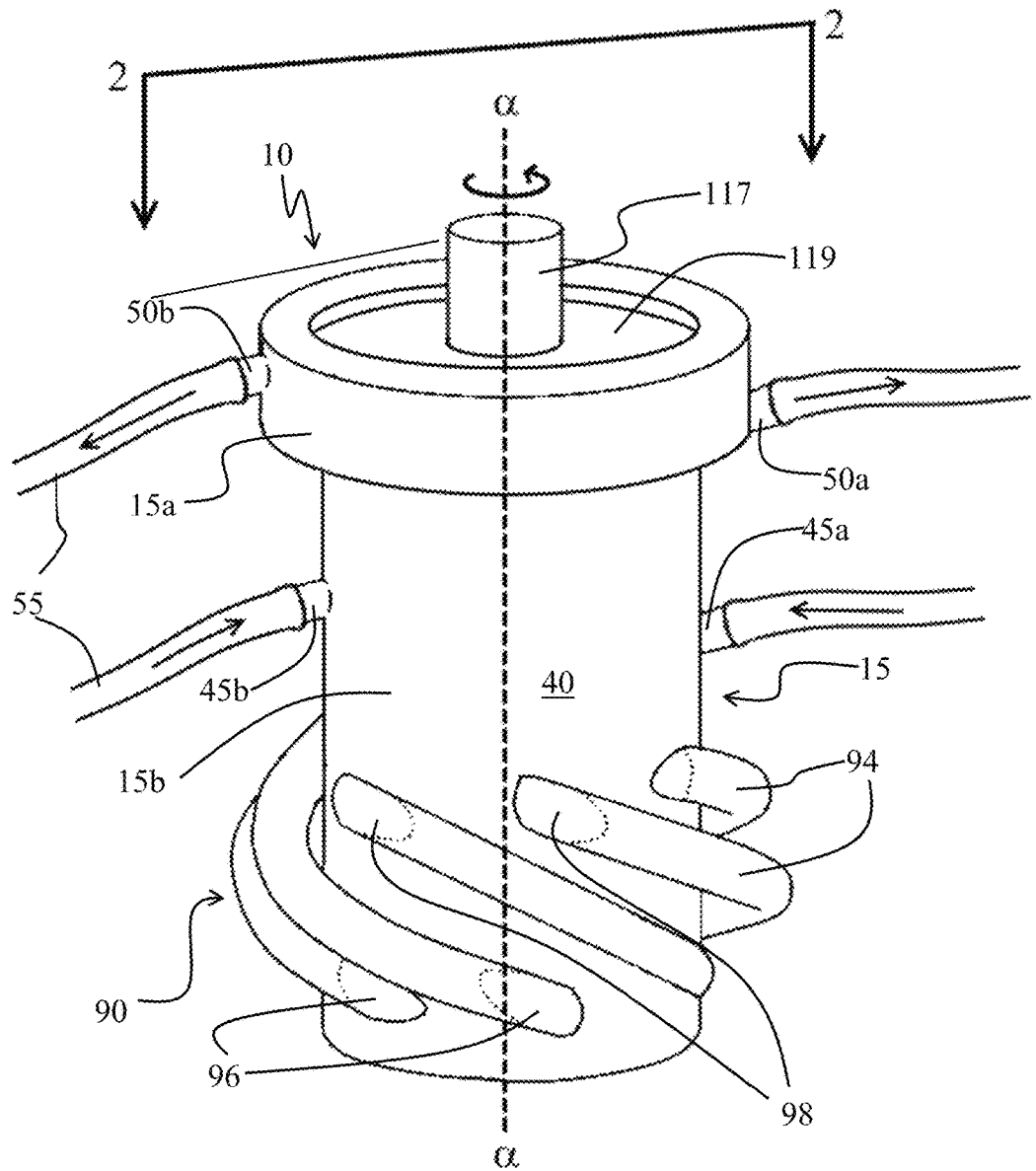
FIG. 1 is a perspective view of an annular centrifugal contactor in accordance with the features of the present invention.

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

A salient feature of the invention is its miniaturization of mixing and separation components. The use of approximately 1 to 2 cm diameter mixers featured in the system and method enable the processing of relatively small volumes (less than approximately 100 milliliters), thereby facilitating process evaluations which often deal in such small volumes. Adequate feedstock volumes to such miniaturized systems include manual feeds with pipettes and/or syringes. For example, syringe volumes of 1 ml-5 ml are often utilized in GC and HPLC separations, and such volumes first processed with the invented system streamline those downstream analyses.

Miniaturization of the centrifugal contactors discussed herein results in hold up volumes not exceeding about 2 to 3 milliliters, such that steady states are reached with 3 millimeter liquid volumes. So as long as the minimum hold up volumes are maintained, continuous separations can occur with as little as about 10 to about 15 milliliters of feed solution volumes. A feature of the invention is that the rotors of such systems are no more than from about 1 cm to about 5 cm in diameter, and more typically between about 1 cm and 1.5 centimeters, and most preferably about 1.25 cm in diameter. The components are printed as a single part such that the invented fabrication technique results in no welds or seams existing on liquid contacting surfaces such as the rotor, the vanes, and/or the housing.

The inventor's use of 3D printing to produce the invented compact centrifugal mixers resulted in compact surfaces. While these compact designs enabled the processing of small volumes of liquid, unique eddy currents and other fluid actions occurred as a result of these small volume fluid flows, which had to be addressed.

Liquid throughput is proportional to the radius squared of the system. For example, a 5 cm rotar can process about 2 liters per minute, a 2 cm rotor can process about 150 ml per minute, and a 1.2 cm rotor can process about 30 ml per minute. Less throughput means less waste for ultimate disposal. This is of particular value when testing new processes and extraction systems where a limited supply of key components may be available or have costly synthesis.

The invented system and process facilitates the combination of ligands to achieve efficient co-extraction of Actinides and Lanthanides with subsequent Actinide separation from Lanthanide. Separation factors more than 20 are achieved when using the invented system and method such that more than 20 more lanthanide than actinide is recovered.

Figure 2A:
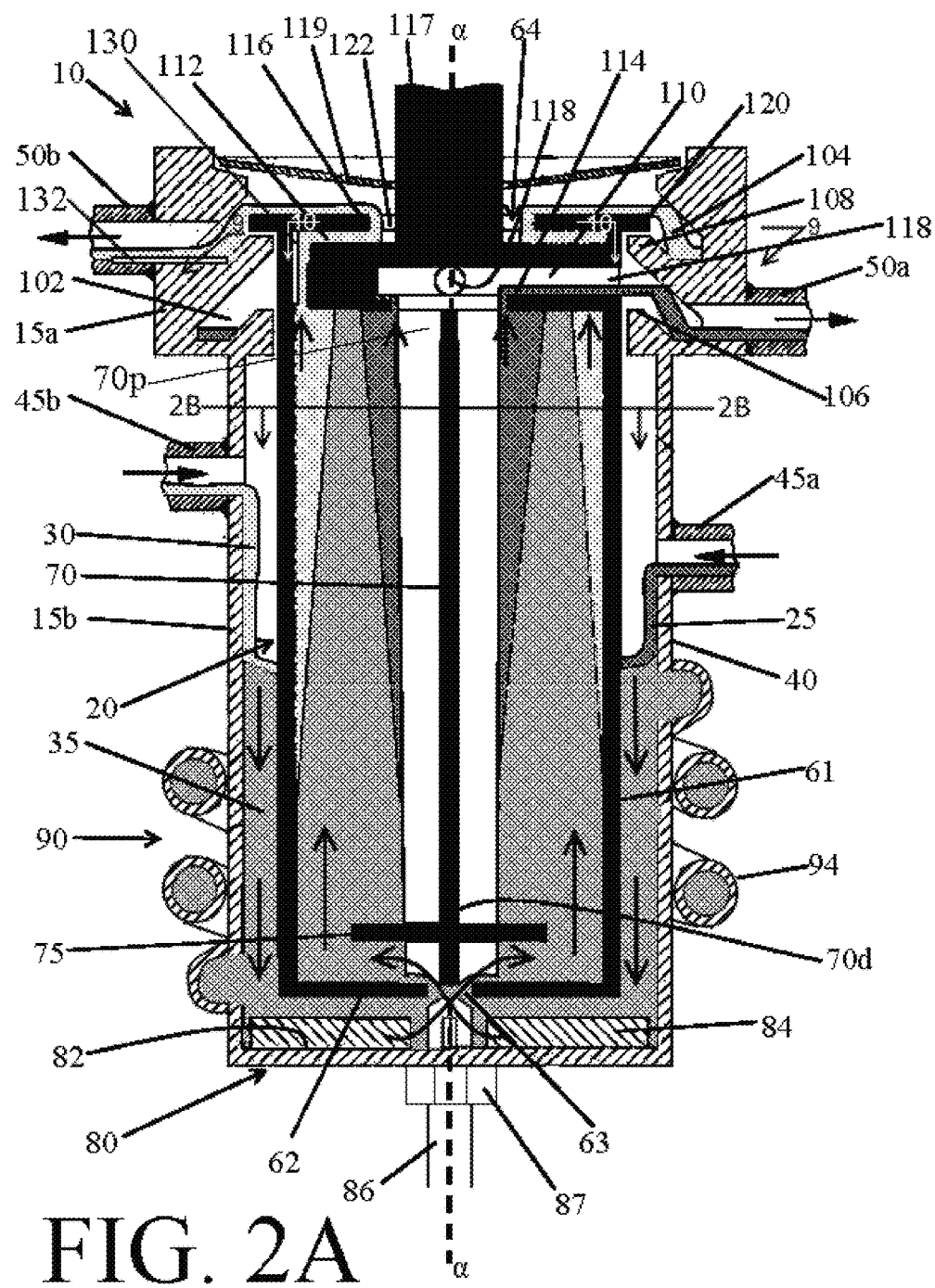
FIG. 2A is a sectional view of the annular centrifugal contactor of FIG. 1, taken along line 2-2.

A perspective view of an embodiment of the invention (designated as numeral 10) is depicted in FIG. 1. A sectional view of the embodiment depicted in FIG. 1 is shown in FIG. 2A. Referring to FIG. 2A, the invented annular centrifugal contactor 10 provides longer residence times as a result of improvements to its mixing zone, including the vane plate. The contactor 10 utilizes a stationary housing 15 and a spinning rotor 20 to mix and separate a light phase liquid 25 and a heavy phase liquid 30 (light and heavy phase, as used throughout the specification, refer to the relative densities of the liquids being mixed and separated). The light phase 25 and heavy phase 30 are combined to form a mixed phase 35 (i.e., a liquid-liquid dispersion) on the interior of the housing 15. While mixed, a constituent or constituents of one phase will transfer, dissolve, or transfer and dissolve into the other phase, thereby selectively extracting a desired constituent or constituents. The phases are then centrifugally separated inside the rotor. In this way, a solvent extraction process can take place between the light phase 25 and the heavy phase 30.

As depicted in FIG. 1, the exterior of the annular centrifugal contactor 10 is defined by a housing 15. The housing 15 generally takes the shape of a cylindrical canister with an open top and a closed bottom. The housing 15 has a first section 15a at the top and a second section 15b below the first section 15a. The first section 15a is typically wider in circumference than the second section 15b because the first section 15a contains fluid collection means. In an embodiment of the present invention, the first section 15a and the second section 15b are modular such that the sections can be separated and combined with identical replacement sections or other different sections that are perhaps used for different applications. The second section 15b is defined by a perimeter wall 40, which contains a plurality of inlets. Typically, the number of inlets is two with one inlet being a light phase inlet 45a and the other being a heavy phase inlet 45b. The first section 15a also defines a plurality of outlets. The typical number of outlets is two with one outlet being a light phase outlet 50a and the other being a heavy phase outlet 50b. In an embodiment of the invention, the light phase outlet 50a is on the same side of the device as the light phase inlet 45a. Similarly in this embodiment, the heavy phase outlet 50b is on the same side of the device as the heavy phase inlet 45b.

The inlets and outlets are coupled with transfer conduits 55 so as to deliver the liquids to the contactor and remove them from the contactor to a storage continer or another contactor (not shown). In an embodiment of the invention the light phase inlet and outlet are located on the same side of the device approximately diametrically opposed to the heavy phase inlet and outlet. Arranging the inlets and outlets for a given phase on the same side and those for the other phase diametrically opposed facilitates connecting several contactors together in series. Further, when so connected, the transfer conduits will run countercurrent between stages with one phase being conducted from stage to stage down one side of the bank of devices and the other phase being conducted in the opposite direction. Countercurrent flow is preferable in a multistage extraction. In a multistage extraction, the solute rich phase will enter from the most downstream contactor, while the pure extraction phase will enter from the most upstream contactor. In this way, by the time the solute rich phase reaches the upstream end, it will be at its most depleted, but it will be mixed with the purest extraction phase. This configuration provides the best driving force (i.e. concentration gradient between the two phases) for extracting the dilute solutes at the upstream end. Nevertheless, in another embodiment of the invention, the inlets and outlets are located on approximately the same side of the housing, and in other embodiments of the invention, the inlets and outlets are located approximately within 90 degrees of each other along a radial arc formed by the exterior of the housing.

Rotor Detail

As depicted in FIG. 2A, positioned co-axially with the longitudinal axis a of the device, and substantially enclosed within the housing is a rotor 20. The rotor 20 has a cylindrical body defining a sleeve 61 and a bottom surface 62. The rotor sleeve is coaxially arranged with the longitudinal axis a of the device and radially offset therefrom. In an embodiment of the present invention, the rotor 20 has a diameter of two inches, and the outer surface of the rotor sleeve 61 is approximately 0.125 to 0.25 inches radially disposed from the interior wall of the housing 15. Preferably, because the rotor 20 mixes the liquid phases through shear forces, the gap is kept relatively small. A value for the ratio of rotor radius to housing radius of approximately 0.9 is preferred for extractive mixing, and this ratio is typically maintained even as the rotor and housing size increase. However, some contactors use a lower rotor radius to housing radius ratio, as low as 0.8. The shear mixing creates droplets of one liquid phase in a matrix of the other liquid phase, depending on the volume ratio of the two phases in the mixing zone. For example, in a common nuclear related extraction process, an organic phase of 30% by volume tributyl phosphate in dodecane and an aqueous phase of dilute nitric acid are mixed, and the organic phase, having the lower volume fraction, will form droplets in the aqueous phase matrix. Under typical mixing conditions for this extraction process, the droplets are on average approximately 100 μm in diameter. However, if the gap between the housing and rotor is too large, then the phases are inadequately mixed, meaning that the droplet size is larger than average. Larger droplets have a smaller surface area to volume ratio, and therefore, the aggregate area of the interface between the phases is vastly decreased, leading to a smaller amount of solute transfer. The invention, with its related enhanced mixing topographies, create droplets that are typically between about 50 and about 75 microns, and preferably below 50 microns (e.g, between about 30 and about 50 microns).

As stated, a relatively smaller interfacial area between the phases decreases the amount of solute transfer over a given time as compared to a relatively larger interfacial area. Increasing residence time is one way to promote solute transfer, but simultaneously increasing the interfacial area between the phases will further promote solute transfer. The interfacial area can be increased by decreasing the size of the droplets. Decreasing the annular gap between the housing and the rotor is one way to decrease the droplet size—however, such a change also decreases the overall volume of the mixing zone.

Another way to decrease the size of the droplets is to vary the topography of the medially facing surfaces 66 of the rotor sleeve 61 and/or the outer surface of the rotor sleeve. The inventor found that restrictions to fluid flow in narrow regions become exacerbated in smaller devices. As depicted in FIG. 2A, modifications of the housing include regions of medially facing surfaces of the sleeve defining grooves 131. In an embodiment of the invention, the grooves are situated just below the annular space 122 through which the heavy phase 30 flows. The topography includes longitudinally extending regions of the medially facing surfaces defining the grooves 131 or channels.

The grooves are positioned in a concave region of the rotor wall defining a heavy phase underflow depression or slot 130. As an alternate embodiment, the underflow slot itself can have a helical twist of the same proportion without the use of grooves. This performs the same function and may be a better design choice for contactors larger than ~2 cm where the small grooves may not have enough effect.

In an embodiment of this 3D printed topography, the grooves 131 or slots 130 or both are angled away from the direction of rotation, such angle β ranging from between approximately 2 degrees and approximately 20 degrees, and preferably from about 5 to about 10 degrees from the longitudinal axis of the rotor. This angle β is chosen through empirical study and fluid dynamics simulation to predict pressure drop and therefore to provide pumping action to counteract the resistance of the flow through this rotor region. The grooves and its angle further ensure that the two phases pass through the rotor and out their respective weirs. If resistance to fluid flow is too high, the heavy phase will instead flow over the light phase weir thereby leading to contamination of the light phase.

Figure 10:
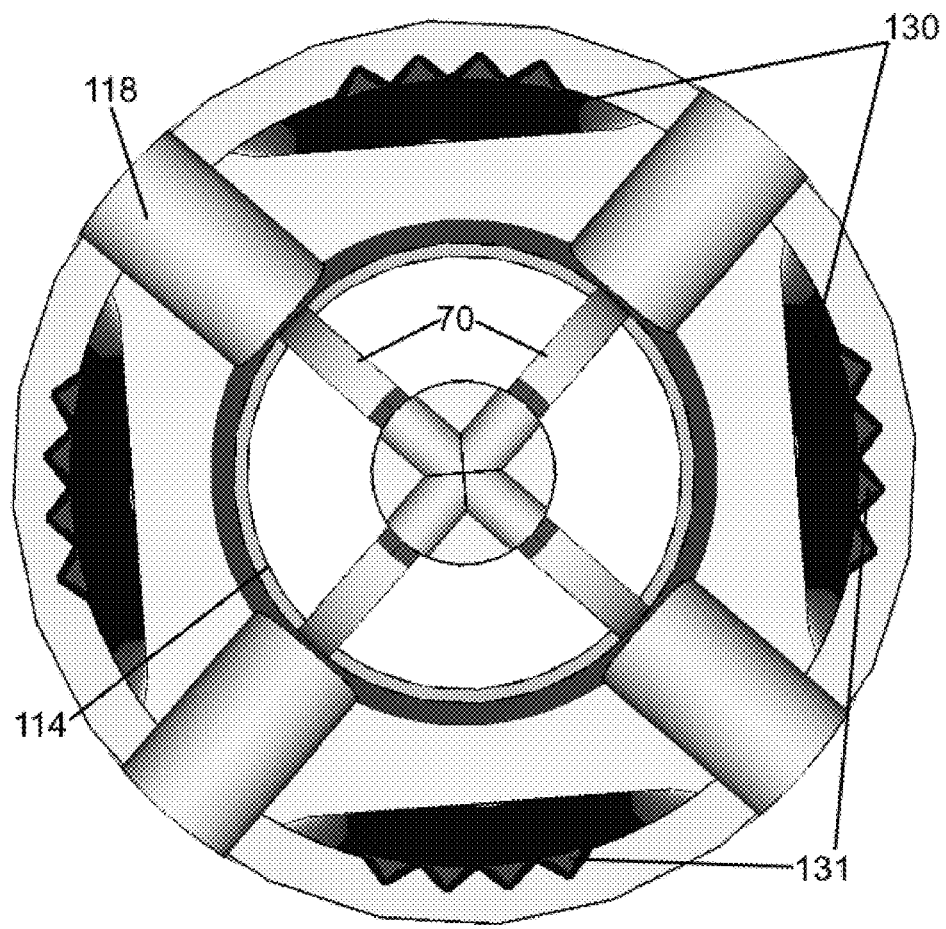
FIG. 10 is a view of FIG. 2A taken along line 10-10.

The grooves 131 may be either straight, or shaped as helical twists about the rotor axis. In an embodiment of the invention, four grooves with a slight helical twist about the rotor axis pump fluid upward through the slot 122 and counteract pressure drop through this narrow section. FIG. 10 is a view of FIG. 2A depicting the grooves. This rotor cross sectional view through the organic phase outlet portal 118 and the aqueous underflow region 130 depicts the grooves as generally "V"-shaped. Four sets of grooves are depicted, each set comprising four grooves. More or fewer grooves are suitable. Each set of grooves are positioned approximately 90 degrees along the arc of the rotor to each other such that one set of grooves diametrically opposes another set of grooves at the opposite side of the rotor.

Generally, if the rotor turns to the right, then the grooves extend to the left upwardly and in a spiral configuration. This forces the fluid upwardly and through the slot.

FIG. 2A further depicts modified topography on fluid surfaces defining the heavy phase egress port 50b. The modified topography includes longitudinally extending regions of the port defining grooves 131. Optionally, the grooves, 131, the egress port 50b or both can define a downward slope to also help convey liquid out of the collector ring. This downward slope feature provides a means for enhancing connection and flow between adjacent stages.

While the groove 131 is depicted extending radially toward the mouth of the port 50b, the groove may be extended throughout the floor of annular ring defining the peripheral regions of lateral aspects of the heavy phase weir. This continuous groove in the ring floor, similar to the continuous groove 124 depicted in FIG. 9, would further facilitate wicking of the liquid out of the ring.

Figure 3A:
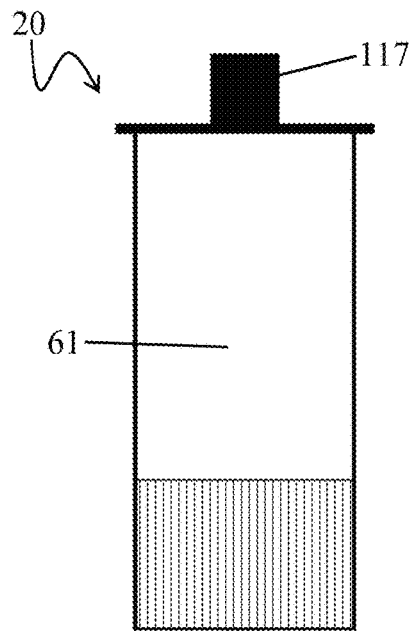
FIGS. 3A-D depict topographical modifications to the outer surface of the rotor.
Figure 3B:
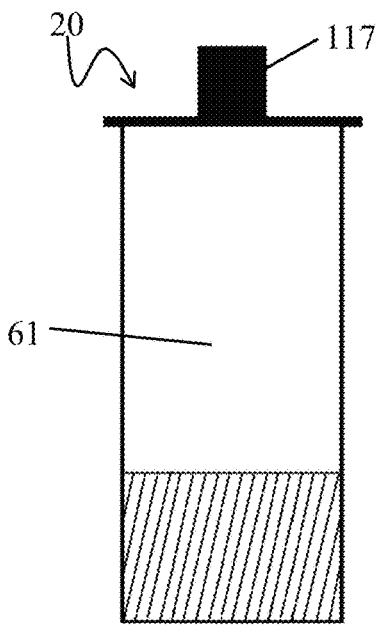
Figure 3C:
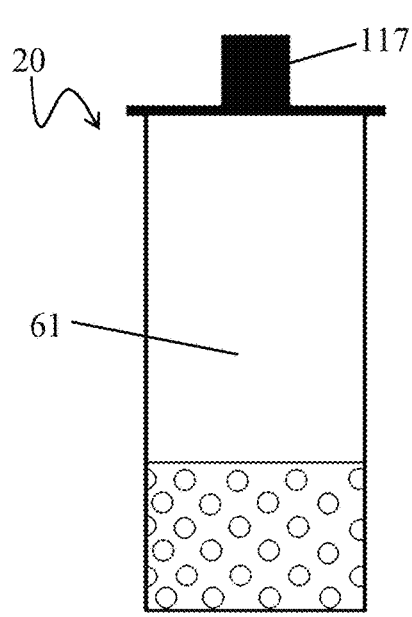
Figure 3D:
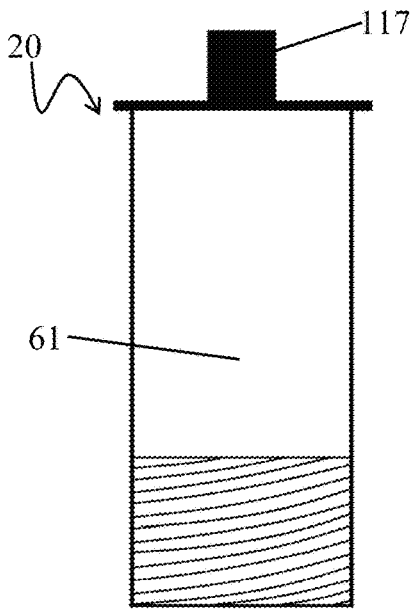

As to modifications to the rotor surface, a variety of topographical patterns are shown in FIGS. 3A-D. FIG. 3A depicts a fluted pattern. FIG. 3B depicts another fluted pattern in which the teeth are angled more than zero degrees but less than 90 degrees from the vertical pattern depicted in FIG. 3B. FIG. 3C depicts a dimpled surface. The dimples of FIG. 3C can be depressions, raised mounds, or a combination of both. Further the depth or height of the depressions or mounds can vary with their vertical location, such as having relatively deeper or higher dimples near the bottom of the rotor and relatively shallower or lower dimples near the top of the pattern. FIG. 3D depicts raised helixes on the surface of the rotor. The helixes are arranged opposite to the direction of rotor spin so as to provide upward motion of the fluids near the rotor. The topographical patterns extend from the distal end of the rotor upwardly over approximately one-tenth to one-half the length of the rotor with the patterns terminating below the housing inlet entrance region 45.

The bottom surface 62 of the rotor is a substantially flat, planar, toroidal section. The center of the toroidal section defines a circular aperture 63, which allows the mixed phase 35 to enter the interior of the rotor 20 from a region of the device that is below the position of the phase inlets 45a, 45b so as to allow mixing of the two phases prior to ingress of the mixed phase into the interior of the rotor. In this configuration, the mixed phase migrates to the aperture 63 via a combination of gravity, pressure differential between the liquid height in the annular region and the interior of the rotor, and flow direction exerted by the stationary housing vanes 84. A superior end (i.e., top end) of the rotor 20 defines an extraction lid 64. The lid 64 facilitates removal of the isolated light phase 25 and heavy phase 30 from the rotor using a series of weirs discussed in detail below. The sleeve 61, bottom surface 62, and lid 64 can all be separate components that are assembled prior to operation of the contactor, or these components can be integrally formed into a single component.

Substantially encircled by the rotor sleeve 61 are two separation vanes 70. The separation vanes 70 cover a substantial portion of the longitudinal distance between the aperture 63 and the weirs in the lid 64. The separation vanes 70 also span the inner diameter of the rotor 20. Thus, the separation vanes 70 divide the interior of the rotor into four generally similarly dimensioned chambers, such that the vanes are orthogonally arranged to each other. Such a configuration ensures rigid body motion of the fluids inside the rotor. This prevents liquid residing in the rotor 20 from sloshing during rotation, which could otherwise create imbalance in the rotor 20.

Figure 2B:
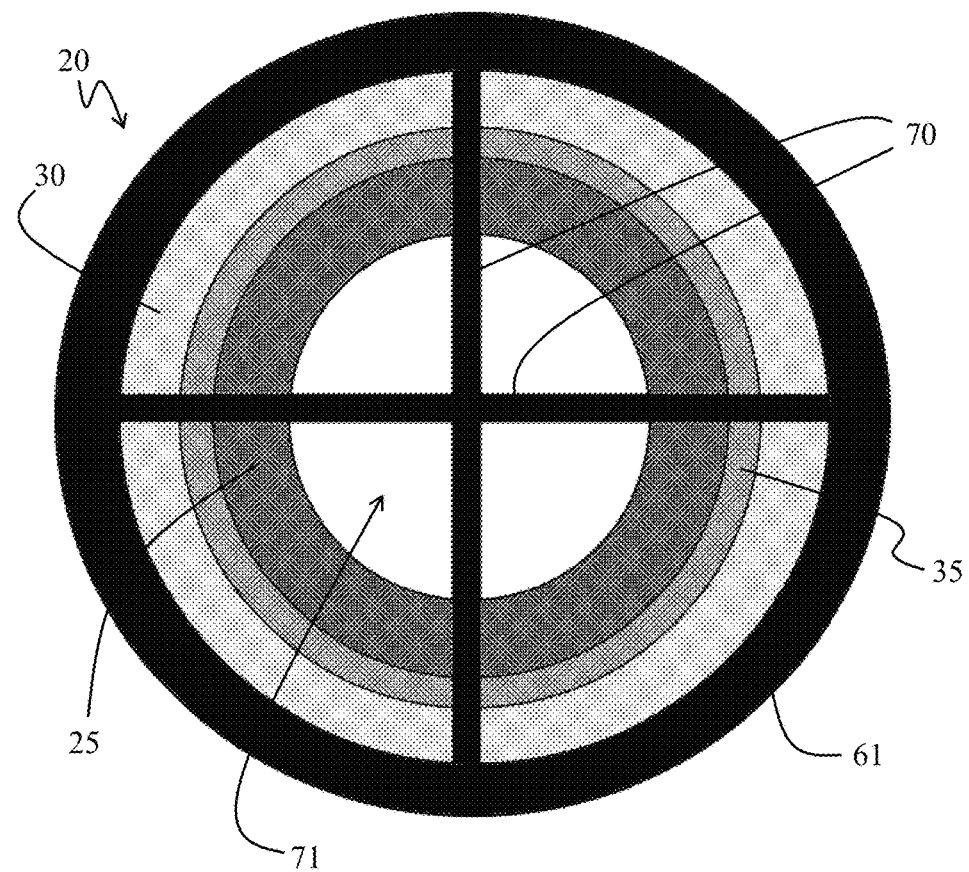
FIG. 2B is a sectional view of the rotor taken along line 2B-2B of FIG. 2A.

As can be seen in FIG. 2B, in each of the four chambers, the heavy phase 30 occupies a layer in the outermost radial extent of the chamber, followed by the mixed phase 35 situated in between the outer, heavy phase layer and the light phase 20. Similarly, the light phase 20 situated between the mixed phase, and an air space 71. All phases seek their respective venues along the radial spectrum, based on their relative densities. Successful phase separation occurs within the rotor 20 when the radial extents of the mixed phase layer are in between the light phase weir 114 and heavy phase weir 116 such that no mixed phase is allow to exit the rotor with either stream.

In larger rotors, an extension of the rotor shaft 117 can be provided at the intersection of the separation vanes 70 so as to add stability to the rotor. As a consequence, the size of the air space 71 is decreased but the operation of the rotor is not affected. In some embodiments, a diverter 75 is located proximal to the distal end 70d of the separation vanes 70. In an embodiment of the invention seen in FIG. 2A, the diverter 75 is a circular disc that directs fluid entering the rotor 20 towards the medially facing surface of the rotor sleeve 61.

Figure 4:
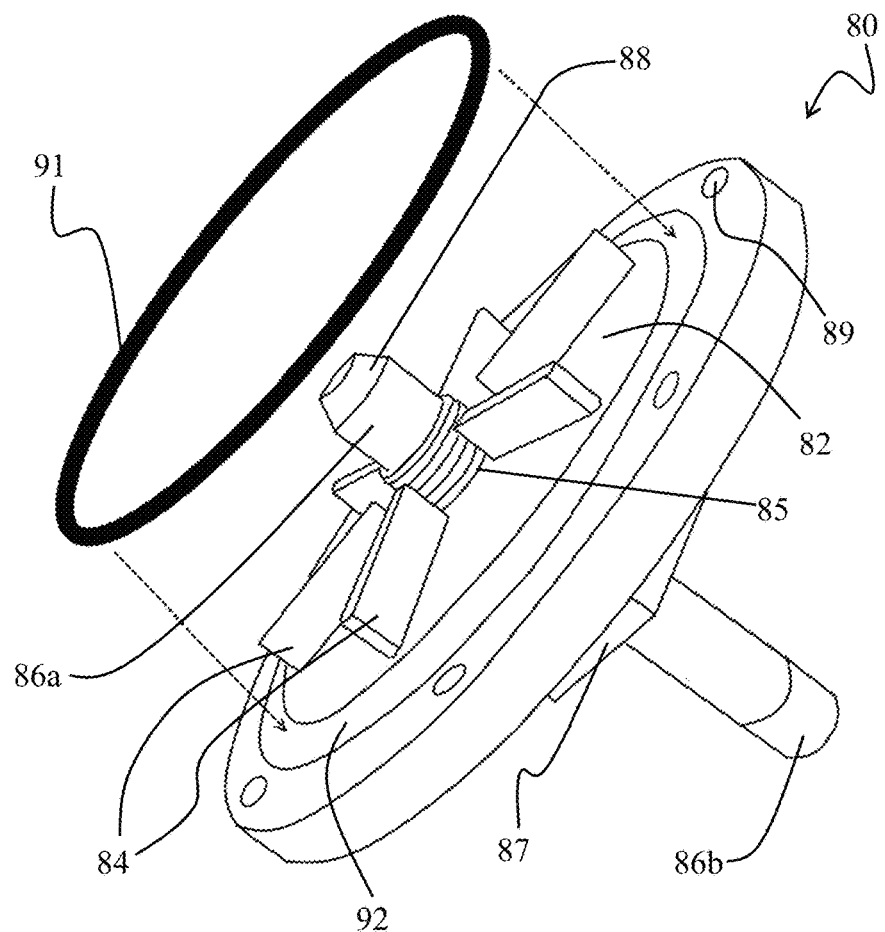
FIG. 4 is a vane plate with adjustable stem for an annular centrifugal contactor in accordance with the features of the present invention.

As can be seen in FIG. 2A, below the rotor 20 is a vane plate 80. The vane plate 80 defines a floor surface 82 of the housing 15. The vane plate can be integrally molded to the housing 15, or it can be reversibly attached to the housing 15. FIG. 2A depicts an integrally molded embodiment, while FIG. 4 shows a reversibly attachable embodiment. Referring to FIG. 4, the portion of the vane plate 80 that defines the floor surface 82 has a plurality of vanes 84. The vanes 84 are depicted as rising upwardly from the floor surface 82 and extending radially from the longitudinal axis a towards the inwardly facing wall of the housing 15. In both of the embodiments depicted in FIGS. 2A and 4, a gap is provided between the radially pointed tips of the vanes 84 and the interior wall of the housing 15. The inventor has found that providing a gap that is approximately half the distance between the rotor sleeve 61 and the interior wall of the housing 15 will help to increase liquid height in the annular space while still avoiding vortex formation external of the rotor. Thus, in a contactor with a 0.25 inch gap between the rotor and housing wall, an eighth of an inch is provided between the radially facing tip of the vane and the housing wall. However, in other embodiments, the vanes 84 extend to the interior wall of the housing. While the rotor 20 is spinning, the vanes 84 prevent a vortex from forming below the rotor 20 and serve to direct flow of the mixed phase 35 toward the rotor aperture 63. The vanes 84 and vane plate 80 are stationary.

The number and type of vanes 84 has an effect on the holdup volume and, thus, the residence time in the housing 15. High throughput (i.e., low residence time) embodiments use a large number of vanes to direct the liquid into the rotor. Moreover, curved vanes are more efficient than straight vanes at directing liquid into the rotor, resulting in lower annular holdup. However, if too few vanes are provided, then a vortex will form, the liquid will not be pumped into the rotor, and the mixing zone will flood. Additionally, too few vanes could cause the liquid in the housing to back up into the inlets and restrict the upper bound for total throughput in the device to a value well below the theoretical throughput of the rotor. In order to provide adequate mixing height and somewhat longer residence times, while avoiding detrimental operation, the inventor has also found that six straight vanes are optimal for most applications and over a variety of feed rates. Four vanes can be used for applications that will constantly operate at feed rates at least about fifty percent below the maximum allowable rate. Moreover, for operations employing a modified housing 15 having helical tubes, such as depicted in FIG. 2A, the use of either four or six straight vanes provides the annular liquid height required (i.e. approximately to the height of the helical tube outlets) to ensure the tubes are filled and liquid mixture flows through them smoothly.

Formed in the center of the floor surface 82 is an opening 85 that extends axially through the thickness of the vane plate 80. In an embodiment of the invention, this transverse opening 85 is substantially circular and is threaded along its axial length so as to form a threaded aperture. The opening 85 is adapted to receive a vane plate stem 86. The stem 86 has a first end 86a that is designed to transversely extend through vane plate 80 from the underside of the plate. The stem 86 has a second depending end 86b that protrudes from the bottom exterior of the housing 15. A portion 93 of the stem length is threaded so as to engage the threads in the opening 85. This threaded engagement allows the stem 86 to be rotated upwardly and downwardly within the opening 85, thereby varying the stem's vertical distance from the rotor aperture 63. The vane plate stem position can be adjusted manually or through a mechanized apparatus.

Figure 5A:
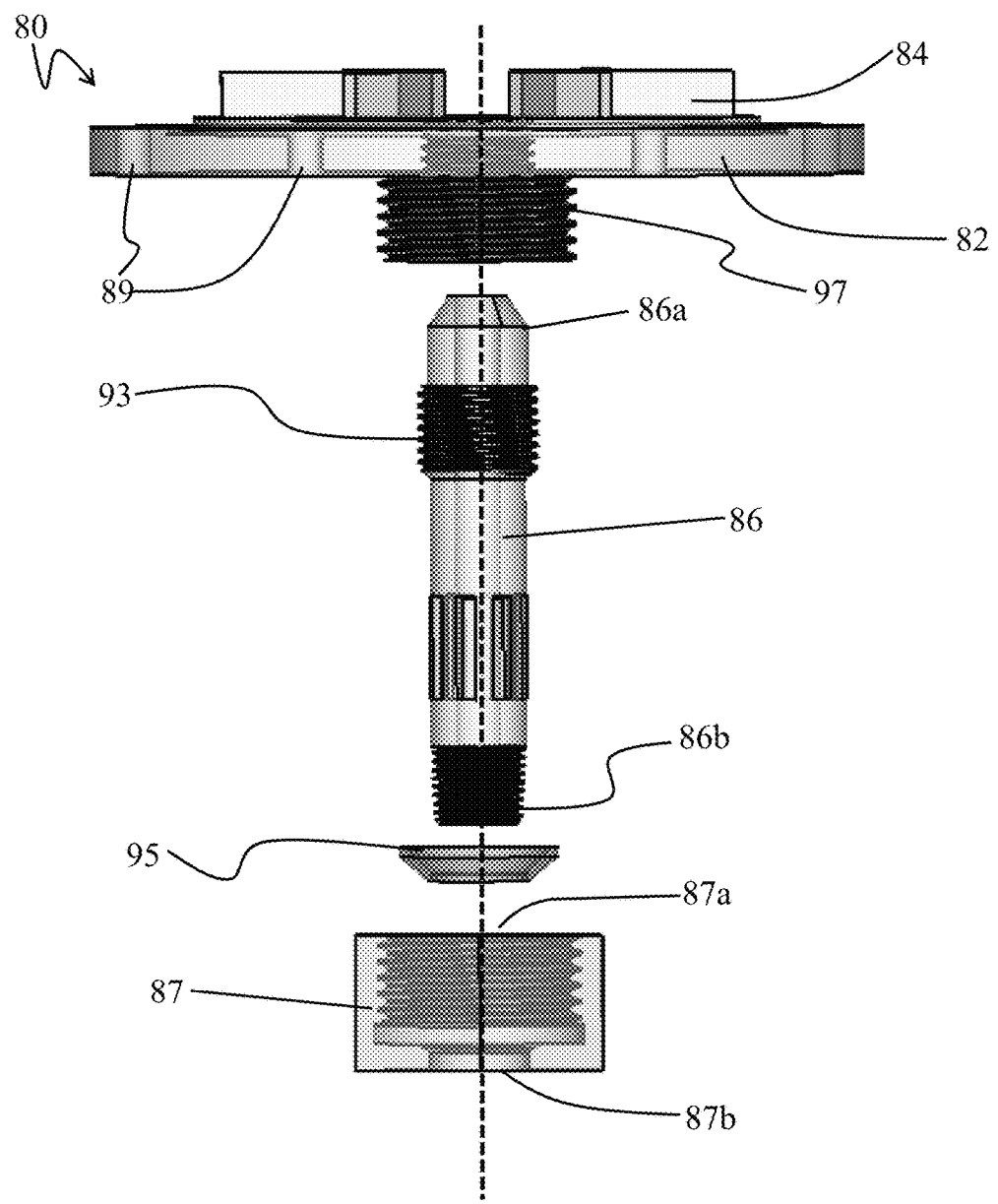
FIG. 5A is an exploded view of the vane plate as depicted in FIG. 4.
Figure 5B:
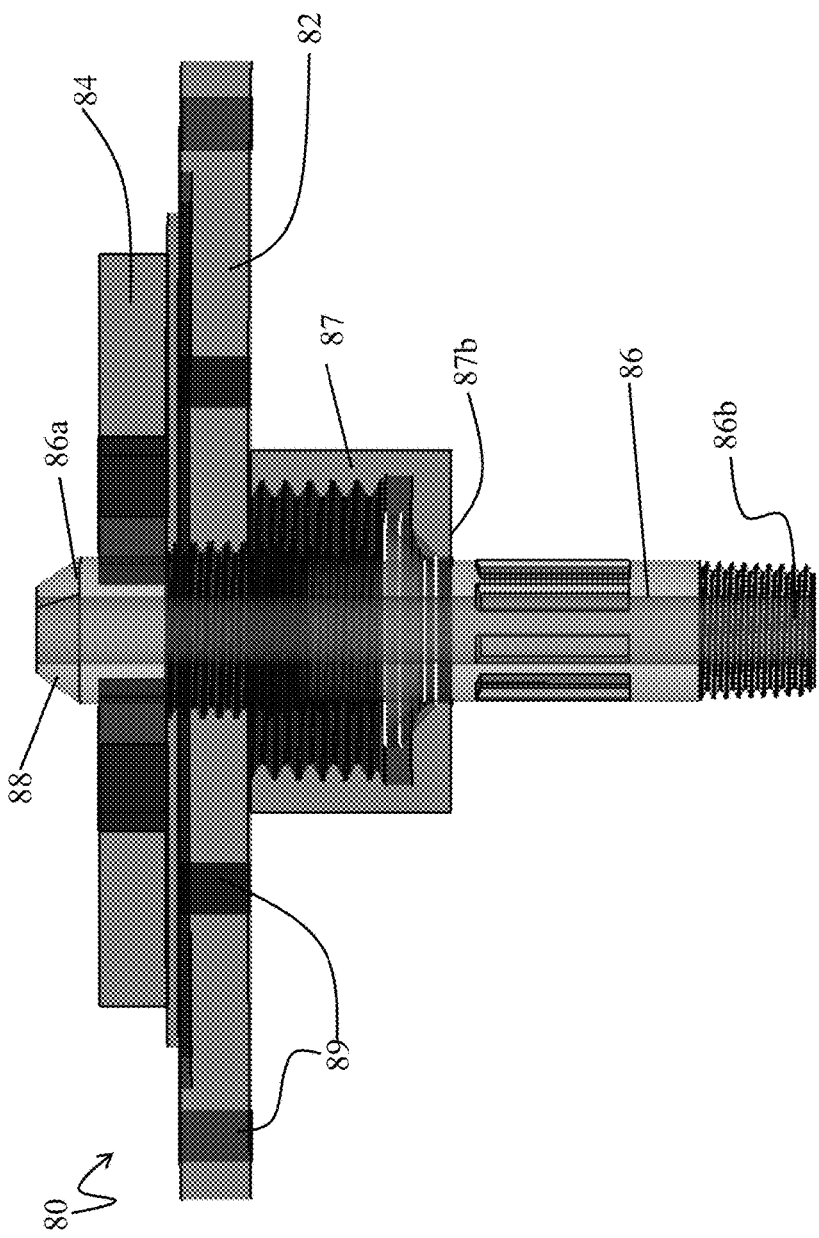
FIG. 5B is a sectional view of the assembled vane plate of FIG. 5B.

On the underside of the vane plate 80, the opening 85 and stem 86 are sealed against leaks from the interior of the housing 15 using a compression fitting. As can be seen in FIG. 5A, the compression fitting is comprised of a ferrule 95 and a nut 87. The nut 87 has internal threads that engage threads on an attachment region 97 that extends distally from the underside of the vane plate 80. The first end 87a of the nut has a relatively wider opening that the second end 87b. The first end 87a is wider to engage the attachment region 97, while the second end 87b is narrower to closely accommodate the diameter of the stem 86. As stated, the opening 85 in the vane plate 80 has threads to engage externally threaded portion 93 on the stem 86. When the nut 87 is tightened, the ferrule 95 is compressed into the interface around the stem 86 at its junction with the second end 87b of the nut 87. FIG. 5B shows this embodiment as assembled.

In a preferred embodiment, the stem 86 is hollow such that it defines a conduit running axially along its length. This configuration provides a means for draining (via gravity) or otherwise evacuating contents of the housing 15 when the stem is lowered. In this instance, the stem serves as a drain tube. When acting as a drain tube, the second end 86b of the stem 86 can optionally be coupled with a fluid transfer conduit 55. In another preferred embodiment, the first end 86a of the stem 86 is shaped so as to cut off or reduce flow into the rotor aperture 63. As shown in FIG. 4, the first end 86a defines a frustoconically tapered region 88. When the tapered region 88 is raised and lowered within the rotor aperture 63, the amount of fluid that can enter the rotor 20 can be varied or completely cutoff. In this way, the adjustable nature of the stem 86 and the tapered region 88 acts like a needle valve. In another embodiment (not shown), the first end of the stem 86a may define a tubular sheath with perforations. As the stem 86 is raised, the sheath surrounds the rotor aperture 63. Incoming mixed liquid must enter the rotor 20 through the perforations, which only allow a restricted amount of liquid to enter the aperture 63.

While the drawings and discussion thus far have referred to an adjustable vane plate stem, the stem 86 could also have a fixed height and geometry relative to the rotor aperture 63. In this embodiment, the contactor would have a set of reversibly attachable vane plates 80. Thus, for example, in industrial setups where the feed rates and extraction processes are relatively constant for long lengths of time, the vane plate 80 and stem 86 position can be preselected to provide desired performance without any worry of leaks in the vane plate stem 86. In such setups, the vane plate 80 can be removed and new vane plate 80 attached should the contactor be required to operate under a new set of extraction parameters.

In embodiments with a reversibly attachable vane plate 80, a means to attach the vane plate 80 to the housing 15 is provided. A variety of means are suitable. In the embodiment depicted in FIG. 3, the periphery of the vane plate 80 contains a plurality of through holes 89. These through holes 89 lie in registration with matching threaded holes in the housing (not shown) such that the vane plate 80 and housing 15 can be joined with a screw or bolt. Further, a channel 92 is formed into the surface of the vane plate 80 proximal to the radially facing tips of the vanes 84, such that the channel defines an annular groove. An O-ring 91 is placed in the channel 92 prior to combining the vane plate 80 with the housing 15 to seal the housing 15 from leaks.

The combination of the second section 15b of the housing 15 and the vane plate 80 define an annular mixing zone 90.

Reservoir Detail

As can be seen in FIG. 1, an embodiment of the mixing zone 90 is comprised of the substantially tubular perimeter wall 40 of the housing 15 and a fluid reservoir (e.g., a plurality of tubes 94 that helically wind around at least a portion of the housing 15). However, in other embodiments of the invented centrifugal mixer, no externally mounted helical tubes are utilized, particularly where 1) topographies of the rotor surfaces and housing surfaces are sufficient to give adequate mixing time and intensity for the target process and 2) the additional hold-up volume provided by the tubes is not required.

Each helical tube 94 has a first end defining a means of ingress, such as an ingress aperture 96 and a second end defining a means of egress, such as an egress aperture 98. The ingress apertures 96 are located near the bottom of the perimeter wall 40 on the housing 15. The egress apertures 98 are located at a point circumferentially and longitudinally displaced from the ingress apertures 96. The exact placement can vary depending on the application and the size of the mixing zone. In one embodiment in which the housing has an inner diameter of 2.5 inches, the helical tubes span an arcuate angle of slightly more than 90 degrees, and the egress aperture is approximately 1.5 inches above the ingress apertures. Thus, a relatively shallow slope is provided to circulate the fluid through the helical tube 94 using only the momentum of the liquid spinning off the rotor. In other embodiments, the egress apertures 98 are placed a vertical distance above the ingress apertures 96 that is roughly equal to the inside diameter of the housing 15. Typically, however, in all cases, the egress apertures 98 will be placed below the inlets 45a, 45b. The proximity of the tubes 94 to the perimeter wall 40 of the housing can be varied. In the embodiment depicted in FIG. 1, the helical tubes 94 are spatially disposed of the surface of the perimeter wall 40 except for the ingress and egress apertures. However, in other embodiments, the outer surface of the helical tubes 94 can touch or be integrally formed into the perimeter wall 40 so as to be in thermal communication with the perimeter wall or for structural support of the tubes.

In still another embodiment, the tubes 94 can be partially embedded into the perimeter wall 40 such that each tube 94 is in fluid communication with the mixing zone 90 along its entire length. In this embodiment, the tubes 94 are provided a narrow opening that follows the length of the helical path of the tube. Such a configuration allows the liquid mixture in the tubes to continually receive additional mixing force from the rotor and can ensure that ideal mixing is maintained throughout or enhanced.

The helical tubes 94 are formed onto the housing 15 in such a way that the ingress apertures 96 are oriented tangentially to the to the circular flow path of the liquid created by the rotor 20. In this way, the momentum of liquid spinning off the rotor propels the fluid upwardly through ingress apertures 96, into the helical tubes 94, and out of the egress apertures 98. The number of turns, the cross diameters of the tubes, and the number of tubes is determined empirically, depending on the relative mixing volume increase sought. In an embodiment of a contactor with a 2.5 inch inner diameter housing, the annular mixing zone 90 contained six helical tubes 94; however, more or less helical tubes 94 could be used, depending, for instance, on the relative sizes of the mixing zone 90 and the helical tubes 94.

The helical tubes 94 increase the hold-up volume of the mixing zone 90, compared to conventional mixing zones that are typically just annular spaces circumscribing a rotor. In providing helical tubes 94, he mixing zone 90 hold-up volume is increased by the filled volume of the tubes, which produces approximately a twofold volume increase (depending on the number of tubes and their diameter) compared to a similar sized device which does not feature the helical tube configuration of the present invention. In one embodiment, for a contactor housing, having a 2.5 inch inner diameter, the annular body portion has a hold-up volume of approximately 50 mL. Using six helical tubes, each having an interior diameter of 6 mm, the hold-up volume was increased to approximately 95 mL. Various embodiments have been created using between four and six helical tubes with diameters ranging from between 4 mm and 6 mm. However, more or less helical tubes with larger or smaller inner diameters could also be used. The maximum size and number of helical tubes will often be dictated by the size of the mixing zone, i.e., a larger mixing zone can accommodate more and larger helical tubes. One of the beneficial features of the helical tubes 94 is that the additional flow helps to stabilize axial oscillations in the mixing zone 90 for housing vane configurations that would normally exhibit oscillatory annular mixing zone liquid height. Another beneficial feature is that the additional flow from the tubes helps make the annular liquid height more consistent in the rotational direction, which decreases the asymmetries that develop when there are large differences in the feed rates of the two phases.

A salient feature of the present invention is that the mixing zone 90 and the vane plate 80 can be manufactured using a 3D printer. Using 3D printing technology allows for design configurations beyond those that can just be machined or welded. Achieving the complexity of design for miniaturized mixing zones (e.g., less than 2 cm in diameter) may not be possible or, at the very least, economically not feasible using traditional machining and welding techniques. For example, using 3D printing, the inventor has fabricated a plurality of contactors that when combined in a single system, can facilitate separations of liquids which may be generated by very different processes. Specifically, the inventor has developed a modular multi-stage assembly of 3D printable centrifugal contactor stages. This includes both stationary housing and rotors along with interstage connections for the transmission of each phase. Each stage in the assembly can be easily customized with differing designs and/or materials of construction to facilitate specific chemical process requirements.

The implementation of 3D printing to produce miniaturized centrifugal mixers has resulted in the generation of extremely small volumes of final liquid waste forms. However, with these small volumes comes unanticipated eddy currents and surface tension issues viz the surfaces of the miniaturized contactors. These issues need to be addressed to optimize separation efficiencies and therefore economies of these operations. Specifically, 3D printing was utilized to impose nuanced surface detail in these already tiny components.

Figure 6:
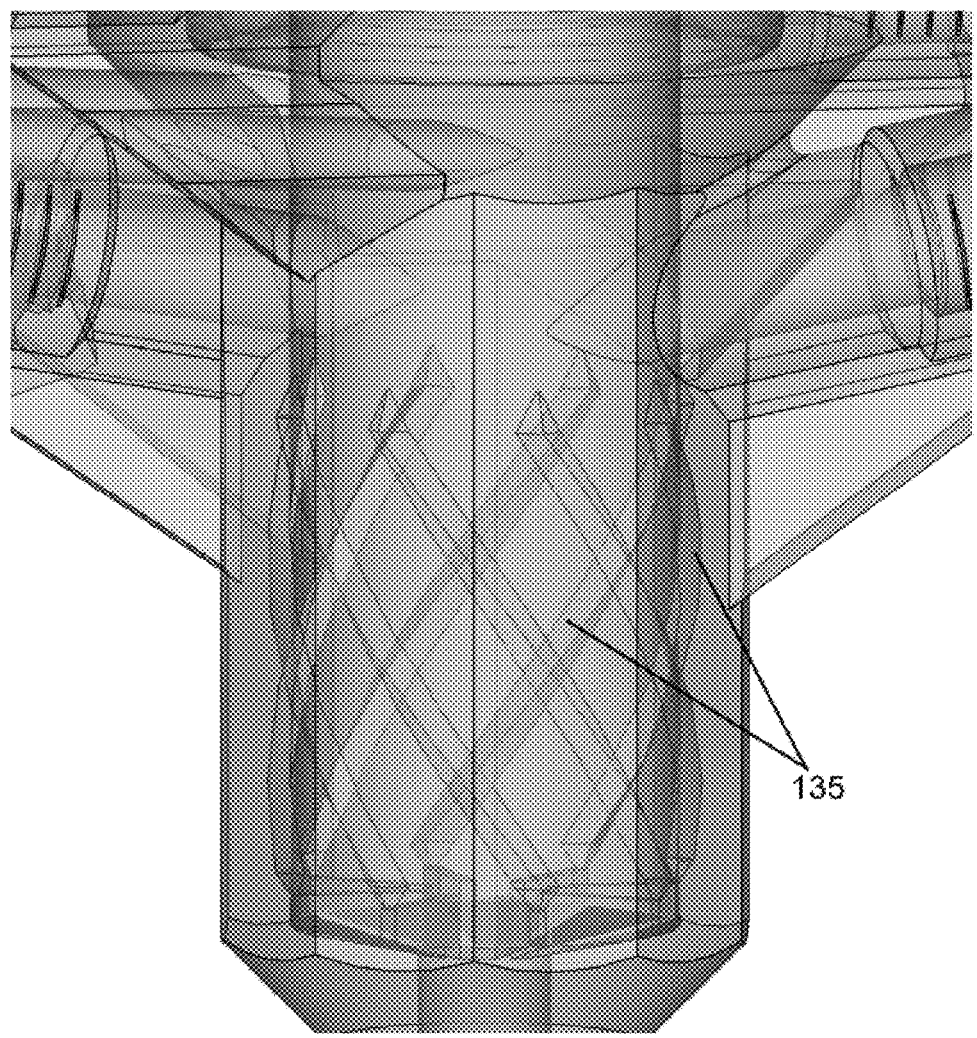
FIG. 6 depicts 3D printing produced surface topography of interior surfaces of a housing defining the confines of a centrifugal mixer, in accordance with features of the present invention.

FIG. 6 depicts lower regions of medially facing surfaces of the mixer housing 15 defining upwardly extending grooves or channels 135. These grooves improve mixing and/or flow orienting the helical twist of the grooves to either aid in conducting flow downward through the gap space existing between a first depending end of the rotor and the floor of the housing. This is particularly effective when the gap is small (such as in a very small contactor unit, <~2 cm rotor diameter). The channels 135 also serve to pump liquid upward to maintain/stabilize liquid height to ensure good mixing. In this embodiment of the invention, no helical tubes are associated with the housing, such as those tubes 94 depicted in FIG. 1.

Figure 7:
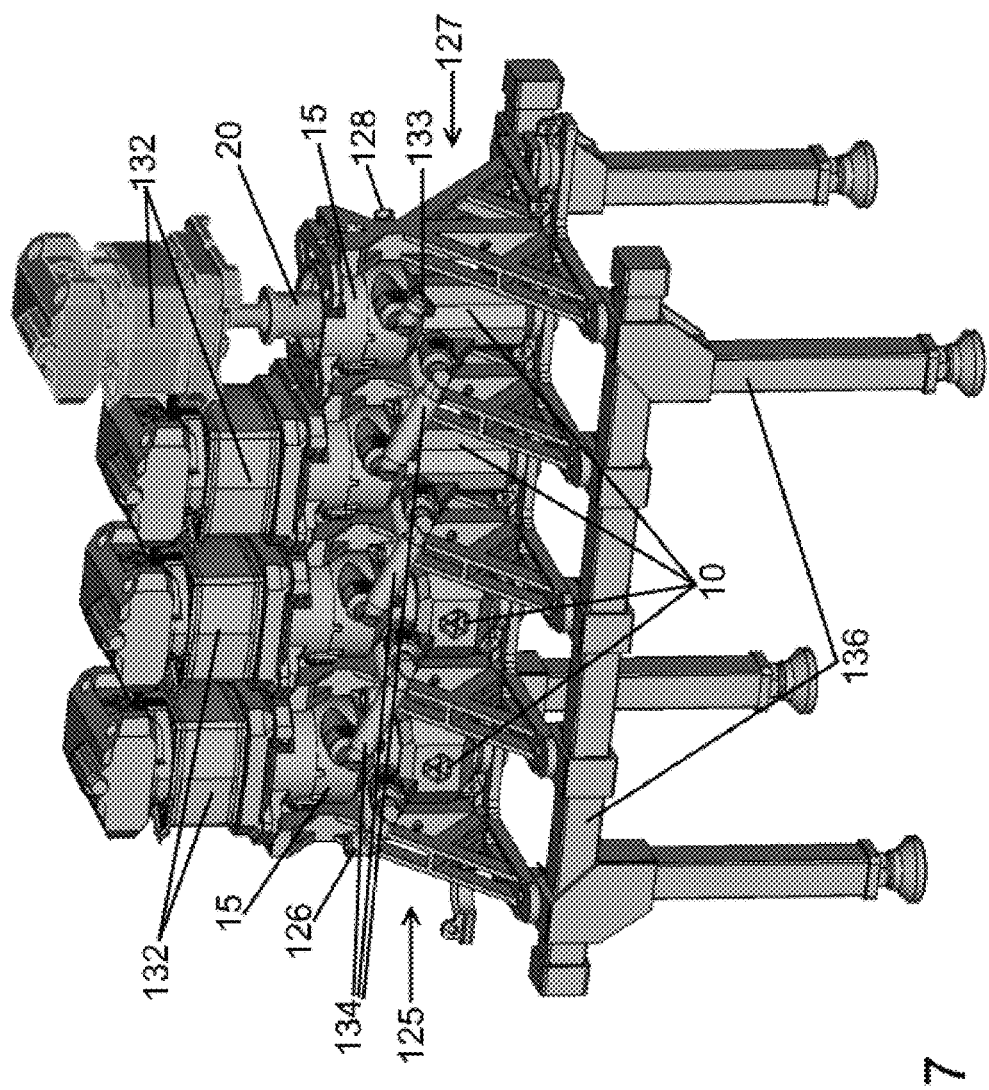
FIG. 7 depicts a multi-module centrifugal mixing system, in accordance with features of the present invention.

In an embodiment of the invention, four modules are positioned in series to create a system having two upstream ends and two downstream ends. FIG. 7 depicts four modules 10 linearly configured with an aqueous phase ingress portal 126 at a first end 125 and an organic phase ingress portal 128 at a second end 127. Proximal to the aqueous phase ingress is an organic phase egress port 128. Similarly, proximal to the organic phase ingress point is an aqueous phase egress port 133. Positioned between the aqueous phase ingress port and the organic phase egress port is the housing 15 of the last contactor at the first end 125 of the system. Similarly, positioned between the organic phase ingress point and the aqueous phase egress port is the housing of the last contactor at the second end 127 of the system. This arrangement confers a countercurrent purification paradigm such that the phases are flowing against each other.

The last contactor at the second end 127 of the system depicts a rotor 20 partially removed from the housing 15. The other rotors are fully nested within their respective housing so as to be not shown. The system depicted in FIG. 7 features a motor 132 for each rotor. However, systems wherein one motor serves all the rotors, or less than all of the rotors, are also viable.

Each of the four modules are tailored to separate phases in succession such that extremely pure (greater than 99.99 percent) constituents are finally produced at their respective downstream ends (i.e., their egress portals). As such, each stage is optimized for liquid density variations for the increasingly purified phases. In the case a motor is dedicated to only one rotor, such optimization may include varying the speed of the rotor. Alternatively, in instances where one motor serves more than one rotor, the speed of that motor can be varied for different rotors at different points or times in a separation protocol.

A plurality of interstage conduits 134 is utilized for each of the aqueous phase flow stream and the organic phase flow stream. These interstage conduits 134 provide the means for transporting once centrifuged phase to the next stage downstream. The conduits 134 also lend rigidity to the entire system. Other means for conferring rigidity to the system such that the stages are fixed in space relative to each other may include a frame or stand 136 to which each of the stages are removably attached.

A variety of 3D printing techniques exist such that using such techniques significantly expands the type of materials that can be used to fabricate the centrifugal contactors. For instance, direct metal laser sintering can print direct to stainless steel and titanium, among other metals. Moreover, 3D printing techniques expand the universe of material options to include a number of polymers, such as PET, PMMA, and PC, which are otherwise not easily machined. As such, in the four module example provided above, a Teflon-constituted module may reside up or downstream from a stainless steel one, which may reside up or downstream from an acrylic-constituted module.

Surprisingly and unexpectedly, the inventor found that the use of 3D printing to produce miniature centrifugal mixers has resulted in fluid dynamics unique to small fluid volumes that must be addressed. Preferably, small contactor designs incorporate miniaturized topographies (e.g., near microscopic features) to assist in smoothing flows in tight regions of the rotor and in the open flowing channels of the bodies (i.e., collector rings, and inter-stage lines). This includes sloping of transfer lines and internal grooves to wick droplets along. Additional features such as helical grooves on the rotor and/or housing may also be needed to adequately force liquids through the unit.

In one embodiment of the mixing zone 90, the helical tubes 94 have internal longitudinal baffles or fins so as to increase the surface area of the tubes in heat or mass transfer applications. The increased surface area enhances heat or mass transfer from the tube 94 and housing wall 40. In another embodiment, the 3D printed mixing zone 90 has helical tubes 94 with interiors that are impregnated with a catalyst or reactant. For instance, some extraction processes require an oxidant or reductant to maintain oxidation states of a solute so that it extracts or is prevented from extracting a certain constituent.

In still another embodiment, the interior of the helical tubes could be coated with an adsorbent so as to capture unwanted elements prior to separation. The adsorbent could be applied during 3D printing or applied afterward such as by flowing a gas through the helical tubes 94. Further, if the housing 15 was made of a relatively inexpensive polymer, the housing could simply be discarded when the adsorbent was saturated with adsorbates. In still another embodiment, heat exchange elements, such as heating tape or heat transfer tubes are placed or formed between the helical tubes 94. The heat exchange elements, which are in physical contact with the exterior surfaces of the tubes, run countercurrent to the flow in the helical tubes and provide finer temperature control as a result of the increased surface area. In the embodiment providing a second set of heat transfer tubes, both sets of tubes are preferably embedded in a solid body of heat conducting material, such as a metal. In yet another embodiment, the helical tubes 94 are jacketed such that a secondary fluid flows through the jacket to heat or cool the helical tubes 94. If the helical tubes are in physical contact with outwardly facing surfaces of the housing, then this configuration further provides a heat exchange means whereby the housing temperature can be further modulated.

Fluid Collection Means

As stated supra, the first section 15a of the housing contains the fluid collections means. The fluid collection means is comprised of a first lower annular groove 102 coaxially arranged with a second upper annular grove 104 which is positioned superior from the first annular groove. Both grooves circumscribe the interior surface of the first section 15a and are in fluid communication with the light and heavy phase outlets. In the embodiment depicted in FIG. 2A, radially extending regions of the lower groove 102 are in fluid communication with the light phase outlet 50a, and radially extending regions of the upper groove 104 is in fluid communication with the heavy phase outlet 50b. Also as depicted in FIG. 2A, the radially extending portions of the grooves 102, 104 are frustoconically configured so as to define a first lip 106 and a second lip 108. The lips 106, 108 prevent separated liquids from spilling back into the mixing zone 90 and prevent liquids from the mixing zone 90 from contaminating the separated liquids. For this purpose, the lips 106, 108 are in close spatial relationship to the rotor 20 but not in contact with the rotor so as to not hinder rotation of the rotor 20 or its insertion or removal during installation or maintenance.

Centrifugal forces created by the rotor 20 separate the light phase 25 and heavy phase 30 on the basis of density. Under the influence of centrifugal forces, the heavier phase 30 will gravitate towards the medially facing surface of the rotor 20, while the lighter phase 25 will remain relatively closer to intersection of the separation vanes 70.

The lid 64 is comprised of a lower chamber 110 in fluid communication with the lower annular groove 102 and an upper chamber 112 in fluid communication with the upper or second annular groove 104. Each chamber 110, 112 is in fluid communication with the interior of the rotor but not in fluid communication with the other chamber. The chambers 110, 112 are defined by a lower weir 114 and an upper weir 116, respectively.

In the embodiment depicted in FIG. 2A, the proximal end 70p separation vanes 70 terminates below the lower weir 114 define an annular space 122 through which the heavy phase 30 flows. The weir 114 obstructs the flow of the mixed phase 35 and the heavy phase 30. Extending from the floor of the second chamber 112 is a rotor shaft 117. The rotor shaft 117 and the upper weir 116 define a second annular space in the lid 64 through which the heavy phase 30 flows. Thus, in the upper chamber 112, the upper weir 116 admits the flow of the heavy phase 25 through the top of the rotor lid 64.

The rotor shaft 117 is coupled to a motor (not shown). The motor powers rotation of the rotor. The speed of the motor is variable depending on the size of the rotor. In a typical application, utilizing a rotor 20 of 2 inches in diameter, the rotor 20 rotates at between 3000 rpm and 4000 rpm. Such a contactor can handle a maximum total liquid feed rate of approximately 2 liters per minute, and with modifications included in this invention, the contactor can have a minimum throughput approaching zero. Surrounding the rotor shaft 117 is a splash plate 119, which prevents liquids (which may be corrosive) from splashing up into the motor and bearings (not shown).

Assembly/Disassembly

The multistage unit is constructed without welds or even drilling of the metal support tubing comprising the support structure 136, as depicted in FIG. 7. This makes it possible to easily assemble, reconfigure, and disassemble the unit. One might take advantage of this to use the unit in a controlled atmosphere such as a glovebox (or hot cell) where a small port can be used to bring the components in and the unit can be assembled in the box.

The components which make the structure fit together are designed in a novel way that makes them adequately rigid when assembled, but also easily fabricated by 3D printing. The use of plastic components provides some additional toughness to parts. Carbon fiber impregnated plastic (e.g., PETG) is particularly good for such parts and has the added benefit of improved chemical resistance to solvent induced cracking.

The use of 3D printing allows use of a variety of novel materials, otherwise unavailable, such as plastics and the overall assembly is much lighter. Additionally, for application in radioactive processing, the potential elimination of stainless steel components makes much less activated waste when the unit is retired—and at that time, it can be easily disassembled and easily disposed of. The use of 3D printing in the construction also makes possible fabrication with advanced plastics (e.g. carbon fiber impregnated filaments, fluoropolymers) and multi-material configurations which would not be otherwise possible.

Customization and Freedom of Configuration

The multistage assembly as designed and fabricated makes it possible to customize individual stages. This means that each stage can use a unique design and/or be constructed of different materials based on the needs of the chemical process.

Example

A 3D printed unit made of PMMA was used with 5M HCl—a material highly corrosive to stainless steel. Other chemicals used were tetrachloroethylene and tributyl phosphate (as organic solvent) and ammonium hydroxide (as stripping phase). Following a suite of tests to refine process conditions and confirm contactor operation) the extraction of molybdenum from 5M HCl was ran for approximately 4 hrs and a total of approximately 4 L of feed solution containing molybdenum was processed successfully. Stripping with ammonium hydroxide was done the following day using the same contactor unit.

The use of transparent PMMA for the rotor allowed for visual identification of precipitates. As a side note, a 3D printed contactor body configured for continuous recycle with attached elevated printed tanks was used as a wash station for the precipitate laden rotor. This unit was designed simply as a demo for contactors, but found a practical application. These tests clearly demonstrated that the use of HCl in a lab-scale printed contactor is possible. Without 3D printing, the only option would be a contactor machined from a fluoropolymer like Kynar and at least twice the scale—even then, Kynar rotors are not widely available.

Elimination of Separable, Inter-Stage Connections

Figure 8:
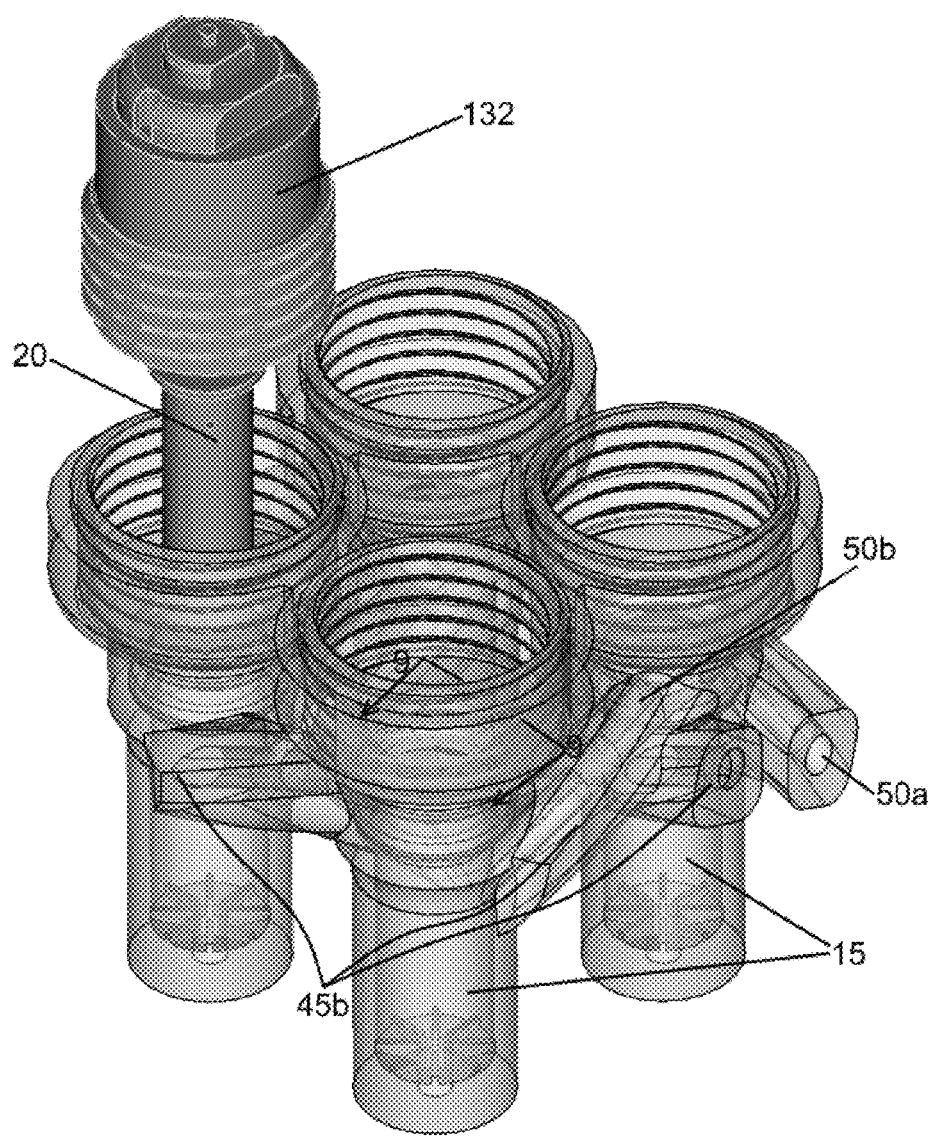
FIG. 8 depicts a non-linear four stage system, in accordance with features of the present invention.

FIG. 8 depicts a four stage multi-stage system in a square configuration. This configuration eliminates the need for separate or removable interstage connections. Rather, the interstage connections depicted in FIG. 8 are integrally molded at each end to the contactor body (for example via 3D printing). From a practical perspective, this eliminates several areas for potential leaks, reduces the linear foot print of the system, and makes it possible to drive all four stages in the assembly using a single power supply—and if gears or belts are used—a single motor. The compact design depicted in FIG. 8 facilitates intra rotor countercurrent flow between aqueous and nonaqueous phases inasmuch as the stages may be closely packed (i.e., in close spatial relationship to each other) and their longitudinal axes orient to provide the most direct path for flow from one stage to another. The fixed downward slope of the interstage channels also facilitates more efficient transport of fluid from one stage to the next stage downstream. The tangential orientation of the egress ports from the collector rings maintains the angular momentum attained by the fluid during processing in the stages. As such, the velocity of the fluid in upstream stages is maintained when the fluid enters the interstage conduits. The tangential orientation of the ingress port on the downstream stage facilitates the efficient clearing out of the fluid from the inlet conduit by the spinning rotor and fluid in the mixing chamber.

As depicted in FIG. 8, the heavy phase enters the inlet port 45b on the rightmost stage and travels from stage to stage in a clockwise direction, as viewed from above, exiting from the topmost stage. The light phase enters the multi-stage assembly at the topmost stage (inlet port not visible in the depiction) and travels from stage to stage in a counter-clockwise direction, as viewed from above, exiting from the rightmost stage at the port labeled 50a. The heavy phase interstage conduits are visible as they are on the outer 'lane' (e.g., periphery) of the square configuration while those for the light phase are on the inside 'lane' and are thus obscured in the figure.

From a nuclear safeguards perspective, the elimination of removable inter-stage connections also has the advantage of eliminating internal points for material diversion, making it more difficult (e.g., require permanent and obvious modification of the unit) for unauthorized personnel to access streams internal to the overall process that may contain higher quantities of sensitive materials than the actual product. The tighter stage-to-stage spacing also would make such a unit better suited for applications requiring heating—for example, as a high temperature molten salt solvent extraction system. While the current focus for this design has been on very small contactor units for lab applications (<2 cm rotor diameter), the concept could be applied to larger contactors. 3D printing makes it possible to tightly integrate all the components.

Contactor Operation

In an embodiment of the invention, the contactor 10 is activated such that the rotor 20 is the only rotating part during normal operation. The distance between the vane plate valve stem 86 and the rotor aperture 63 can be set either before or after the contactor 10 is activated or during rotation of the rotor. Additionally, the vane plate valve stem 86 can be adjusted either manually or through a mechanized assembly. Transfer conduits 55 (depicted in FIG. 1) begin delivering the heavy phase 30 to heavy phase inlet 45b of the housing 15, and the contactor is operated until the heavy phase begins to exit through the heavy phase outlet 50b. At this point the transfer conduits 55 begin delivering the light phase 25 to the light phase inlet 45a. Upon entering the interior of the housing 15 (i.e., the mixing zone 90) the light phase 25 and heavy phase 30 are mixed via the shear forces imparted on the liquid by the spinning rotor 20. Depending on the inlet flow ratio of the two phases, the mixture can consist of a matrix of aqueous phase (heavy phase 30) with droplets of the organic phase (light phase 25) or the opposite (aqueous droplets dispersed in a continuous organic phase). Under typical conditions, the droplets are on average approximately 100 μm in diameter. Because the mixed phase 35 consists of droplets of one phase in the other, the interface between the liquids is increased, which enhances the transfer of moieties from one phase to the other. The ingress apertures 96 of the helical tubes 94 are oriented tangentially to the flow of the mixed phase 35 so as to capture the momentum of the fluid created by the rotor 20 and recirculate it to the top of the mixing zone 90 through the egress apertures 98.

The vanes 84 on the vane plate 80 direct the mixed phase 35 into the rotor aperture 63. The vane plate valve stem 86 controls the flow restriction of the rotor aperture 63 such that height of mixed phase 35 in the annular mixing zone region (and consequently the active/effective mixing zone volume) required to push liquid into the rotor 20 can be varied. If a small flow restriction is provided, i.e., the vane plate stem 86 is farther from the rotor aperture 63, then a lower height of mixed phase 35 is required to maintain steady flow into the rotor 20. Conversely, if a large flow restriction is provided, i.e., the vane plate stem 86 is closer to the rotor aperture 63, then a greater height of mixed phase 35 is required to maintain steady flow into the rotor 20. The pressure head resulting from the height of the mixed phase 35 in the mixing zone 90 is balanced with the pumping action of the rotor aperture lip (resulting from the radial position difference of the rotor inlet edge and the surface of the liquid(s) inside the spinning rotor) and forces the mixed phase 35 through the aperture 63 in the bottom surface 62 of the rotor 20. Inside the rotor 20, the diverter 75 (if included) directs the mixed phase 35 outwardly towards the central region of the liquid layer 35 (FIG. 2B).

Because the rotor 20 is rotating, the centrifugal forces cause separation of the mixed liquids based on their relative densities. (As discussed supra, the individual liquids are first chosen based on their immiscibility with each other.) Therefore, from the distal end of the rotor located at the floor surface 62 to the proximal end located at the lower weir 114, a physical phase separation gradient develops wherein the heavier phase 30 is radially urged against the interior of the rotor sleeve 61 via centrifugal force. The lighter phase 25 is, in relative terms, less affected by centrifugal force, so it resides relatively closer to the center of the rotor. Any remaining mixed phase 35 occupies the region between the heavy phase 30 and the light phase 35.

The lower weir 114 of the lid 64 defines an opening near the center of the lid proximal to the rotor shaft. Because the centrifugal forces have created a separation gradient in which only light phase 25 exists near the center of the rotor 20, the weir 114 only allows light phase 25 to enter the lower chamber 110. The lower chamber 110 has a plurality of lower chamber openings 118 (typically there are four chambers) through which the light phase 25 flows out of the rotor and into the lower groove 102 of the housing for collection. Centrifugal forces cause the light phase 25 to flow out of the lower chamber opening 118 and into the groove 102. The light phase outlet 50a evacuates the light phase 25 from the lower groove 102, and the light phase 25 can be transported to a container or another contactor via a transfer conduit 55. The heavy phase 30 will move upwardly along the interior of the sleeve 61 until it reaches the upper chamber 112. Pressure is maintained on the heavy phase 30 in the upper chamber 112 from below as a result of the pressure head due to the height of the mixed phase 35 in the annular mixing zone balanced with the pumping action of the rotor inlet lip. Thus, the heavy phase 30 partially fills the upper chamber in the direction of the rotor shaft 117. Upon reaching the inner edge of the upper weir 116, the heavy phase 30 flows upwardly through the annular space defined by the upper weir 116 and the rotor shaft 117, where centrifugal forces again cause it to flow outwardly. The annular edge 120 of the rotor lid 64 acts as a slinger ring to deliver the heavy phase to the upper groove 104 of the housing, which is in fluid communication with the heavy phase outlet 50b.

Figure 9:
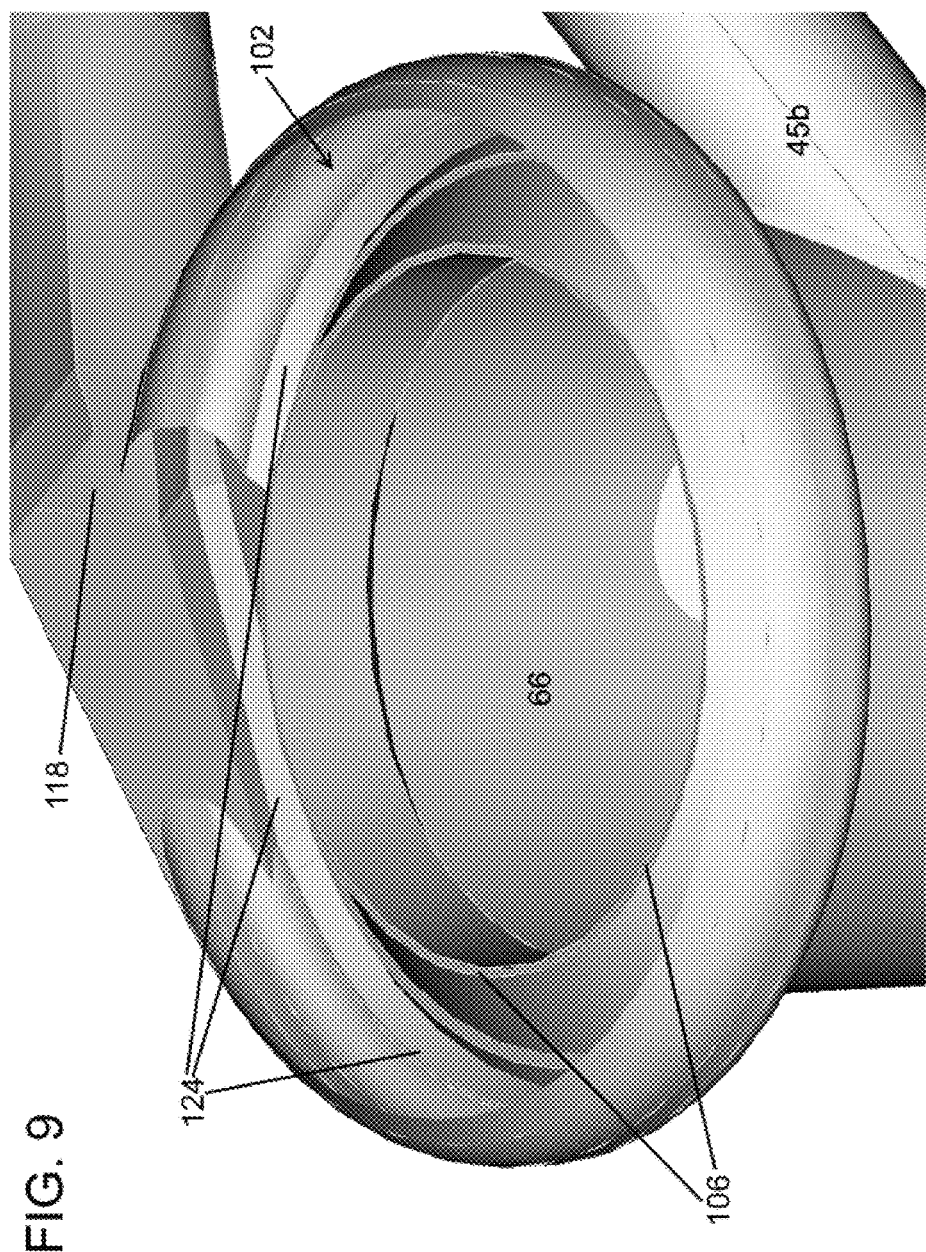
FIG. 9 is a view of FIG. 2A and FIG. 8 taken along line 9-9, in accordance with features of the present invention.

FIG. 9 depicts topographical detail of the lower collector ring 102 of just the stationary housing, with no rotor shown. The topography of the collector rings for the housings of such small rotors (e.g., wherein the diameters are equal to or less than 1 mm in diameter) are facilitated with 3D printing.

An embodiment of the invention comprises regions of surfaces of the light phase collector ring 102 and heavy phase collector ring 104 defining grooved channels. So situated, the grooves 124 wick or otherwise draw liquid out of the horizontal regions of the collector rings and into the downward sloping egress ports for each phase. Without such wicking grooves, surface contact adhesion forces and liquid surface tension can slow fluid progress to the respective exit port and lead to overflow of the collector ring. Overflow of the upper collector ring (heavy phase) would lead to contamination of the light phase in the lower ring whereas overflow of the lower ring returns fluid down into the annular space of the mixing region 35—the latter being less detrimental to stage extraction efficiency than the former, but still undesirable as its persistence can lead to 'flooding' of the mixing region.

In an embodiment of the 3D printed topography, the channels are "V" shaped and circumscribe the channel, terminating at the liquid phase outlet 118. There may be one or several separate grooves 124 within the channel, all of which terminate at the liquid phase outlet 118. Alternatively, a plurality of grooves may merge into one, and prior to reaching the liquid phase outlet 118.

The grooves 124 may be contained along the medial sides of the channel (e.g., those sides of the channel closest to the axis of the rotor), the lateral sides of the channel, the floor of the channel, or combinations thereof. The grooves may be "V" shaped, "U" shaped, or squared off. The groove or grooves 124 may have flat, level surfaces defining its walls or floors. Alternatively the grooves may define undulating walls or floors. The channels may have a constant width and or depth. Alternatively, the channels may have varying widths and depths, which may aid in mixing and expediting fluid out to the liquid phase outlet 118. These minutiae topographies in sub-2 cm diameter rotor housings can only be effected via 3D printing. The need for such topographies are ascertained only after observing small fluid flows through unaltered miniaturized housings, themselves fabricated via 3D additive manufacturing.

The present invention has great applicability for nuclear waste reprocessing and particularly for lanthanide and actinide extractions. Two extraction methods that particularly benefit from the present invention are the Trivalent Actinide-Lanthanide Separation by Phosphorous Reagent Extraction from Aqueous Complexes process ("TALSPEAK") and the Actinide Lanthanide Separation process ("ALSEP"). As stated, these extraction processes are kinetically challenged, meaning that the constituents take a relatively long time to transfer from one solvent into the other. Because the present invention increases the residence time by increasing the hold-up volume in the mixing zone 90 and by decreasing the throughput into the rotor 20 with the vane plate 80, the TALSPEAK and ALSEP processes can take advantage of the ease and simplicity of annular centrifugal contactor separation. Additionally, in providing flexible residence times, an optimum balance can be achieved between contact time, extraction efficiency, and solvent degradation for these kinetically challenged extractions.

The presently invented improvements to the design of an annular centrifugal contactor works in conjunction with currently available contactor components. Thus, by providing improvements that increase the residence time of the liquid in the contactor, the performance of other contactor components, such as the rotor, are improved for kinetically challenged extractions. For instance, currently available rotors are designed to provide adequate separation at high throughput. In limiting throughput by increasing residence times in the mixing zone, the present invention allows for the liquids to spend more time in the rotor as well. Thus, the mixed phase has longer time in the rotor to physically separate. As such, more challenging physical separations can be undertaken. Thus, for instance, more aggressive mixing can be undertaken wherein the droplet size is made smaller prior to the mixed phase entering the rotor because the mixed phase will have longer in the rotor to separate. Accordingly, increasing residence time not only provides more time for kinetically challenged extractions, but it leads to other improvements, such as mixing enhancement, that further increase the efficiency of those extractions. Alternatively, the rotors could be spun at a slightly lower RPM and still separate the phases effectively.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment in which an exclusive property right or privilege is claimed is defined as follows:

1. An annular centrifugal contactor, said annular centrifugal contactor comprising:
    a) a housing adapted to receive a plurality of flowing liquids;
    a hollow rotor coaxially positioned within the housing, the rotor defining a first open depending end, and a second open upwardly facing end, wherein medially facing surfaces of the hollow rotor define first fluid flow enhancing topographies;
    b) an annular mixing zone defined by the housing and a vane plate,
    wherein the annular mixing zone has a plurality of fluid retention reservoirs with ingress apertures near the bottom of the annular mixing zone and egress apertures located above the ingress apertures of the annular mixing zone; and
    c) an adjustable vane plate stem, wherein the stem can be raised to restrict the flow of a liquid into the rotor or lowered to increase the flow of the liquid into the rotor.

2. The annular centrifugal contactor of claim 1, wherein the first fluid flow enhancing topographies comprise helically shaped channels positioned along longitudinally extending surfaces of the hollow rotor.

3. The annular centrifugal contactor of claim 1, wherein a plurality of baffles are disposed within each fluid retention reservoir.

4. The annular centrifugal contactor of claim 1, wherein the second open upwardly facing end comprises regions defining fluid flow enhancing grooves.

5. The annular centrifugal contactor of claim 1, wherein each of the fluid retention reservoirs are jacketed with a volume enclosing a flowing heat transfer fluid.

6. The annular centrifugal contactor of claim 1, wherein a plurality of baffles extend from a surface of each of the fluid retention reservoirs.

7. The annular centrifugal contactor of claim 1, wherein the annular mixing zone is impregnated with a catalyst, reactant, adsorbent, or a combination thereof.

8. The annular centrifugal contactor of claim 1, wherein the adjustable vane plate stem is adapted to serve as a needle valve and drain tube.

9. The annular centrifugal contactor of claim 1, wherein the adjustable vane plate stem is in mechanical communication with a mechanized assembly such that the adjustable vane plate stem is adjusted up and down using the mechanized assembly.

\* \* \* \* \*